US012088633B2

(12) United States Patent
Mishra et al.

(10) Patent No.: US 12,088,633 B2
(45) Date of Patent: Sep. 10, 2024

(54) DYNAMIC INTRUSION DETECTION AND PREVENTION IN COMPUTER NETWORKS

(71) Applicant: Hewlett Packard Enterprise Development LP, Houston, TX (US)

(72) Inventors: Abhinesh Mishra, Karnataka (IN); Gopal Gupta, Karnataka (IN); Raghavendra Gopinath, Karnataka (IN); Nirmal Rajarathnam, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 324 days.

(21) Appl. No.: 17/586,936

(22) Filed: Jan. 28, 2022

(65) Prior Publication Data

US 2023/0098508 A1 Mar. 30, 2023

(51) Int. Cl.
*H04L 9/40* (2022.01)

(52) U.S. Cl.
CPC ........ *H04L 63/205* (2013.01); *H04L 63/1425* (2013.01); *H04L 63/1433* (2013.01); *H04L 63/1458* (2013.01)

(58) Field of Classification Search
CPC .............. H04L 63/205; H04L 63/1425; H04L 63/1433; H04L 63/1458
See application file for complete search history.

(56) References Cited

U.S. PATENT DOCUMENTS

| 7,882,193 B1* | 2/2011 | Aronson | H04L 51/212 709/202 |
| 8,424,091 B1* | 4/2013 | Su | H04L 51/212 713/188 |
| 11,849,002 B1* | 12/2023 | Sanchez Rola | H04L 63/1433 |
| 11,882,130 B2* | 1/2024 | Szurdi | G06F 21/64 |
| 2010/0132029 A1* | 5/2010 | Chauhan | H04L 63/0227 726/12 |
| 2012/0258437 A1* | 10/2012 | Sadeh-Koniecpol | G06F 21/56 434/362 |
| 2016/0212201 A1* | 7/2016 | Munemann | H04L 67/306 |

(Continued)

OTHER PUBLICATIONS

Arnaboldi, L. et al., "A Review of Intrusion Detection Systems and Their Evaluation in the IoT," Jun. 18, 2020, 46 pages.

(Continued)

*Primary Examiner* — Stephen T Gundry
(74) *Attorney, Agent, or Firm* — Hewlett Packard Enterprise Patent Department

(57) ABSTRACT

The present disclosure describes dynamic intrusion detection and prevention in computer networks. The method includes generation of clusters of network sites based on a plurality of parameters related to operational features and network threats associated with the network sites. Data models are trained upon the clusters developed through the clustering. The data models are executed to predict a threat frequency of each network threat for each cluster. A difference between the predicted threat frequency of each network threat and corresponding baseline frequencies is determined. Dynamic rulesets are configured, based on the difference between the predicted threat frequency of each network threat and the corresponding baseline frequencies, for each cluster by integrating rules applicable to prevent each network threat.

20 Claims, 7 Drawing Sheets

(56) References Cited

U.S. PATENT DOCUMENTS

| | | | |
|---|---|---|---|
| 2017/0171231 A1 | 6/2017 | Reybok, Jr. et al. | |
| 2018/0288077 A1 | 10/2018 | Siddiqui et al. | |
| 2019/0356679 A1 | 11/2019 | Sites et al. | |
| 2020/0021607 A1* | 1/2020 | Muddu | H04L 43/00 |
| 2020/0314148 A1 | 10/2020 | Verma | H04L 63/0272 |
| 2021/0099484 A1* | 4/2021 | Li | G06F 16/2255 |
| 2021/0136089 A1* | 5/2021 | Costea | G06F 21/56 |
| 2021/0359978 A1* | 11/2021 | Galbreath | H04L 63/1458 |
| 2021/0377304 A1* | 12/2021 | Ma | G06F 40/284 |
| 2023/0370439 A1* | 11/2023 | Crabtree | H04L 63/0428 |
| 2023/0370490 A1* | 11/2023 | Crabtree | H04L 63/1433 |
| 2023/0376592 A1* | 11/2023 | Ma | G06F 21/554 |
| 2023/0385364 A1* | 11/2023 | Aher | H04L 67/535 |
| 2023/0385447 A1* | 11/2023 | Ackerman | H04L 63/20 |
| 2023/0412620 A1* | 12/2023 | Crabtree | H04L 63/1416 |
| 2023/0421582 A1* | 12/2023 | McCarthy | H04L 63/1425 |
| 2023/0421593 A1* | 12/2023 | Crabtree | H04L 63/1433 |
| 2024/0022547 A1* | 1/2024 | Crabtree | H04L 9/3239 |
| 2024/0022595 A1* | 1/2024 | Humphrey | H04L 63/1425 |

OTHER PUBLICATIONS

Yu, Z. et al., "A Framework of Machine Learning Based Intrusion Detection for Wireless Sensor Networks," 2008 IEEE Int'l Conference on Sensor Networks, 8 pages.

* cited by examiner

DYNAMIC INTRUSION DETECTION AND PREVENTION IN COMPUTER NETWORKS

BACKGROUND

Computer networks are prone to various types of network threats. Monitoring of threat patterns is vital in computer networks. Intrusion Detection and Prevention System (IDPS) are generally implemented to detect occurrence of different types of network threats and prevent them from affecting performance and security of the computer networks. Since all computer networks are not same, they are vulnerable to different type of network threats, and thus requires implementation of different rules for preventing the network threats.

BRIEF DESCRIPTION OF DRAWINGS

The accompanying drawings constitute a part of the description and are used to provide further understanding of the present disclosure. Such accompanying drawings illustrate the exemplary implementations of the present disclosure which are used to describe the principles related to the present disclosure. The implementations are illustrated by way of example and not by way of limitation in the figures of the accompanying drawings in which like references indicate similar elements. It should be noted that references to "an" or "one" implementation in this disclosure are not necessarily to the same implementation, and they mean at least one. In the drawings.

DETAILED DESCRIPTION

Figure 1:
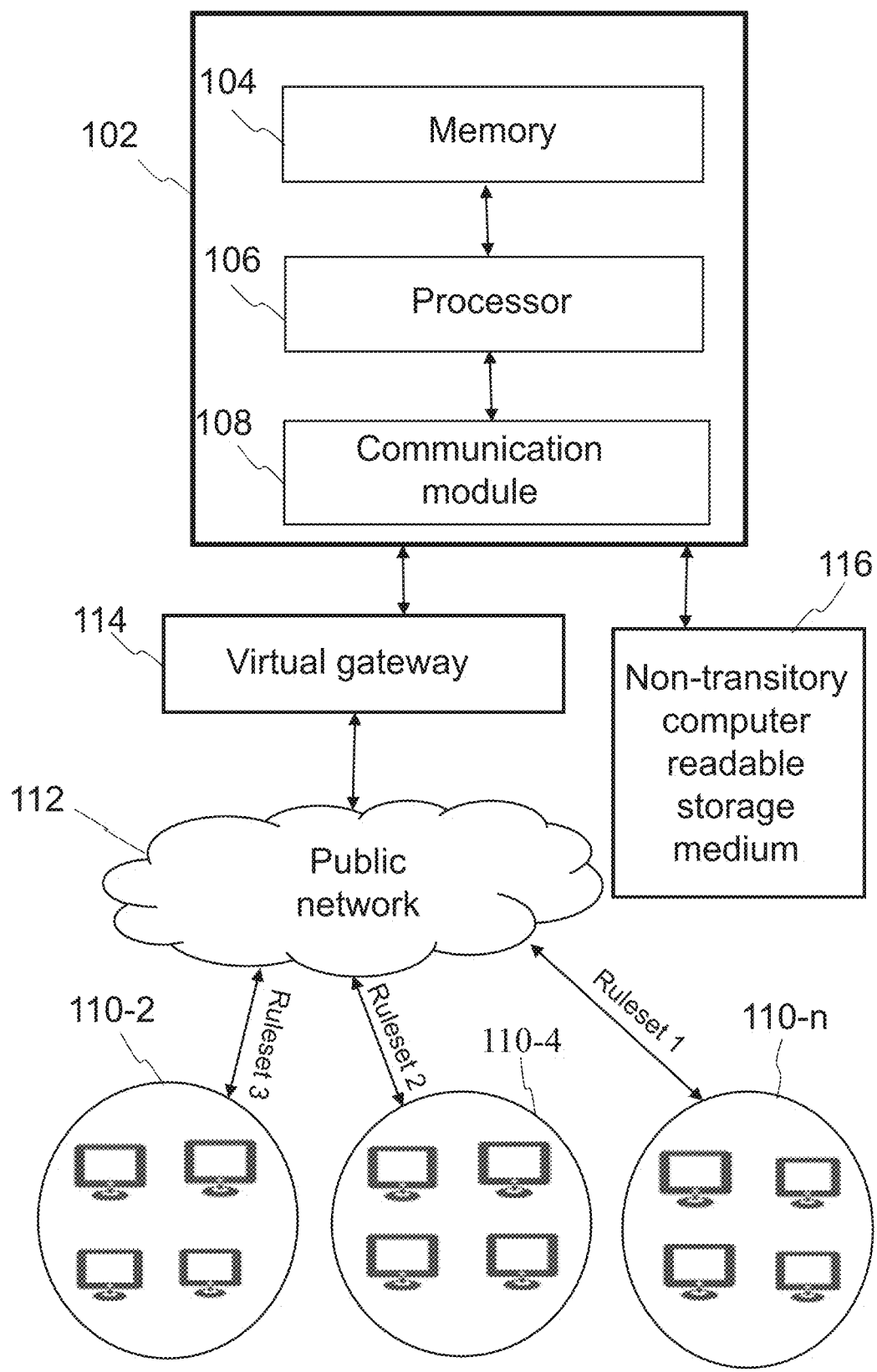
FIG. 1 illustrates an environment including a system performing intrusion detection and prevention, in accordance with an implementation of the present disclosure.

In general, rulesets (set of rules) are utilized for Intrusion Detection and Prevention (IDP) based on severity, category, and duration of occurrence of threats in computer networks. These rulesets may be packaged in different collections, for example, strict, moderate, and lenient. A strict ruleset may include a large number of rules, for example 20,000 rules. A moderate ruleset may include less rules compared to the strict ruleset, for example 15,000 rules, and a lenient ruleset may include least number of rules compared to the strict ruleset and the moderate ruleset, for example 12,000. A network gateway downloads the rulesets and applies one of them based on a predefined network policy, for inspecting and blocking malicious traffic.

The number of rules in a ruleset impacts the performance of an IDP engine and the number of false positives detected by the IDP engine. Detection of false positives impact usability because user intervention is required for auditing, triaging, and unblocking of the false positives. Selection of a lenient ruleset reduces the number of false positives. However, this leads to a reduction in scope of detection of network threats e.g. different types of network threats that could be detected. On the other hand, the selection of a strict ruleset increases the scope of threat detection but could lead to an increase in the number of false positives. Thus, the hard partitioning of rulesets into a set number (e.g., three) of categories with no adaptation to a customer's network threat patterns do not optimally balance the trade-off between high scope of detection of network threats and lower number of false positives detected in a computer network. Therefore, there is a need for an IDP system which dynamically addresses each category and frequency of threats specific to each or a group of similar networks sites.

In order to achieve a balance between scope of detection of network threats and number of false positives, present disclosure provides a process of integration of dynamic rulesets to be applied for preventing each network threat in each cluster.

Present disclosure describes clustering a plurality of network sites using a data clustering technique. The network sites may correspond to different office locations of an organization, for example, Austin, Chicago, Houston, and San Jose may be the different office locations of an organization. The plurality of network sites are clustered using a data clustering technique. Clustering performed by the data clustering technique denotes grouping the plurality of network sites in such a way that network sites in the same group are more similar to each other than to those in other groups. The plurality of network sites are clustered based on a plurality of parameters related to operational features and details of network threats associated with the plurality of network sites. Network threats indicate attempts made by intruders to gain unauthorized access into an organization's network to steal data or to perform other malicious activity. The network threats may be associated with different network attacks, for example, Denial of Service (DoS) attacks, Distributed DoS (DDoS) attacks, Man In The Middle (MITM) attack, phishing attack, ransomware, viruses, and worms. Active network attacks involve modifying, encrypting, or damaging data associated with different user devices operating within the network sites. Thus, details related to different network attacks occurred or attempted over each the plurality of network sites may be used as details of the network threats, for clustering the plurality of network sites.

Data models may be trained upon a plurality of clusters developed through the clustering. Post training, the data models may be executed to predict a threat frequency of each network threat for each cluster of the plurality of clusters. For example, when three clusters of network sites exist, threat frequency (chances of future occurrence) of DoS attacks and phishing attacks may be separately determined for each of the three clusters. Thereupon, a difference between the predicted threat frequency of each network threat and corresponding baseline frequencies may be determined. Successively, dynamic rulesets may be configured for each cluster by integrating rules applicable to prevent each network threat. A count and type of the rules integrated to configure the dynamic rulesets may depend on the difference between the predicted threat frequency of each network threat and the corresponding baseline frequencies, associated with each cluster.

The detailed description set forth below in connection with the appended drawings is intended as a description of various implementations of the present disclosure and is not intended to represent the only implementations in which details of the present disclosure may be applied. Each implementation described in this disclosure is provided merely as an example or illustration, and should not necessarily be construed as preferred or advantageous over other implementations.

FIG. 1 illustrates an environment including a system 102 for performing intrusion detection and prevention, in accordance with an implementation of the present disclosure. In one implementation, the system 102 may be implemented over a cloud network and may include a memory 104, a processor 106, and a communication module 108. The system 102 may be configured to perform intrusion detection and prevention upon a plurality of network sites 110-2 to 110-n (generally referred as network sites 110). In different implementations, the network sites 110 may correspond to different offices of one or more organizations, different project groups of an organization, and the like. The network sites 110 may include multiple devices, such as desktops, laptops, tablets, printers, scanners, network sensors, network routers, network switches, and the like. The network sites 110 may be connected with a public network 112 e.g. Internet. In certain implementations, the devices present within the network sites 110 may communicate with each other over secure network tunnels. The system 102 may be connected with the network sites 110 through the public network 112.

A virtual gateway 114 may be configured over the system 102 or over an external device connected with the system 102 and the public network 112. Data generated as a result of operation of the devices present within the network sites 110 may be provided to the system 102 via the virtual gateway 114. Such data may be referred as telemetry data and may include data accessed by the devices, data generated by activities performed using the devices, and data communicated between the devices. The telemetry data may include raw telemetry information related to the devices, such as details of Operating System (OS), bandwidth usage, and site where the device belongs. Alternatively or additionally, the telemetry data may include aggregated information, such as usage pattern and performance impact. Upon receiving, the system 102 may store the data in the memory 104. The system 102 may process such data to detect and prevent occurrence of intrusions over the network sites 110. Further, a non-transitory computer-readable storage medium 116 may be used to store program instructions responsible for performing intrusion detection and prevention.

Figure 2:
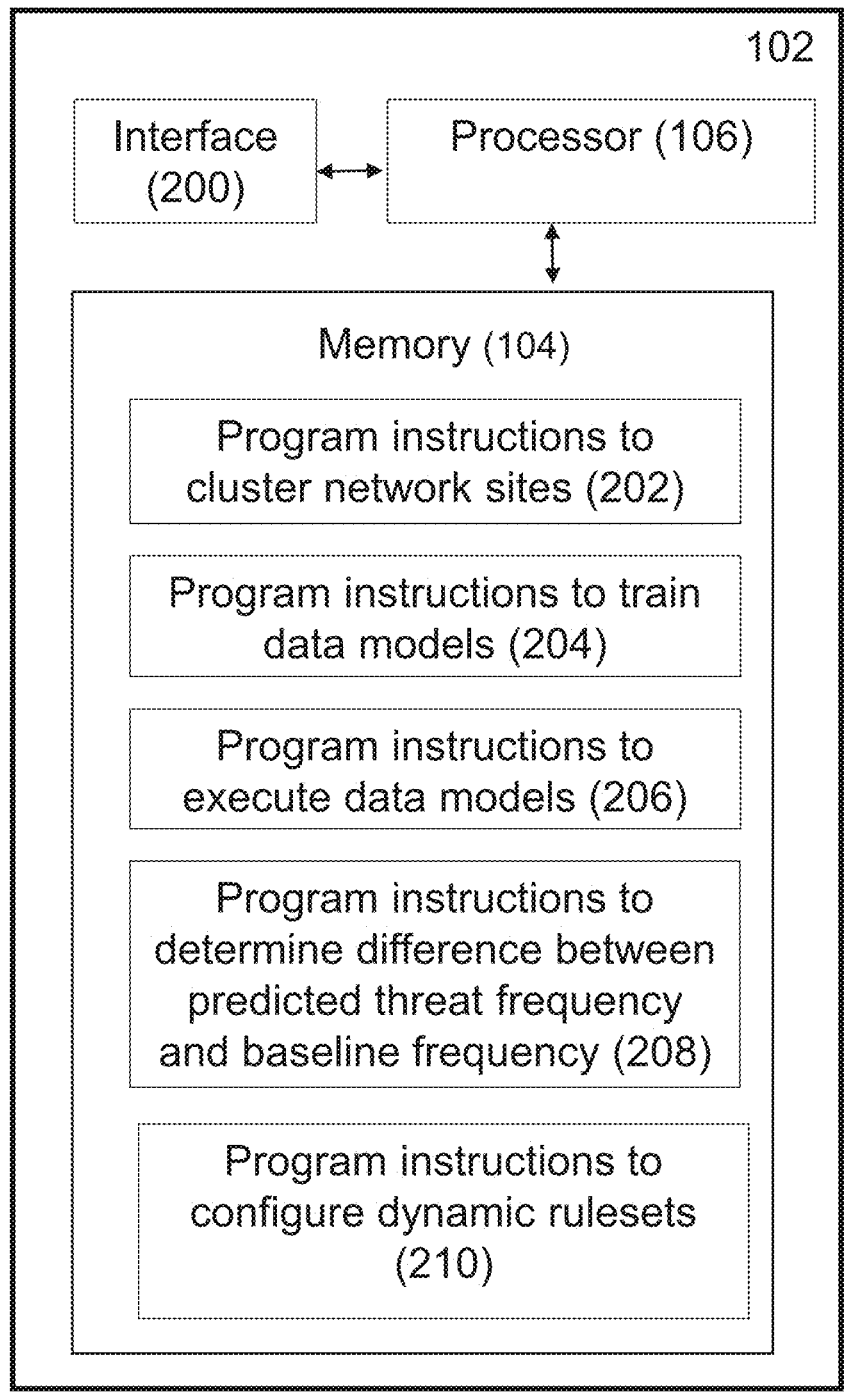
FIG. 2 illustrates a block diagram showing different components of a system performing intrusion detection and prevention, in accordance with an implementation of the present disclosure.

FIG. 2 illustrates a block diagram showing different components of the system 102 performing intrusion detection and prevention, in accordance with an implementation of the present disclosure. The system 102 includes the memory 104, the processor 106, and an interface 200 (similar to the communication module 108). The system 102 may transmit and receive data through the interface 200. The memory 104 may store program instructions to perform several functions for performing intrusion detection and prevention. Example program instructions stored in the memory 104 may include program instructions to cluster network sites 202, program instructions to train data models 204, program instructions to execute data models 206, program instructions to determine difference between predicted threat frequency and baseline frequency 208, and program instructions to configure dynamic rulesets 210.

The program instructions to cluster network sites 202 may cause the processor 106 to cluster the network sites 110. A data clustering technique may be used to cluster the network sites 110 based on several parameters. Such parameters may be related to operational features and network threats associated with the network sites 110. The program instructions to train data models 204 may cause the processor 106 to train one or more data models upon clusters developed through clustering. The program instructions to execute data models 206 may cause the processor 106 to predict a threat frequency of each network threat category for each cluster. The program instructions to determine difference between predicted threat frequency and baseline frequency 208 may cause the processor 106 to determine difference between the predicted threat frequency of each network threat and corresponding baseline frequencies. The program instructions to configure dynamic rulesets 210 may cause the processor 106 to configure dynamic rulesets for each cluster by integrating rules applicable to prevent each network threat. A count of the rules integrated to configure the dynamic rulesets depend on the difference between the predicted threat frequency of each network threat and the corresponding baseline frequencies, associated with each cluster. A detailed functioning of such programmed instructions is provided henceforth.

In one implementation, the system 102 may process several parameters, using a data clustering technique, to cluster the network sites 110. Purpose of the clustering is to group different offices of an organization together based on similarity in types of network threats faced by them, over a predefined time period, in past. Further, based on the similarity in types of network threats, it is also possible to cluster smaller office segments, such as teams within an office, or project groups within an office, in different implementations.

The parameters utilized during the clustering may include location score of a network segment, software stack embedding, a score based on bandwidth consumption by critical and non-critical applications running across the network segment, a score based on pattern of network traffic, a score based on number of different types of network devices connected in the network segment, a score based on user diaspora, a score based on reputation of the network segment, a score based on network threat to the network segment, or a score based on network classification and network tagging. The system 102 may utilize one or more of these parameters to perform the clustering of the network sites 110.

In one implementation, the location score of a network segment (alternatively referred as a branch) may be determined by acquiring a broad understanding of a location of the branch. The location score for the branch may be determined based on geolocation features, such as city type, country, and security index. Additionally or alternatively, the location score for the branch may be determined based on business activity performed at the location of the branch. Depending on criticality of business tasks being executed at the location of the branch, the location may either be identified as a high priority location or a low priority location. High priority locations, such as sales team office and CEO office may be identified by an administrator or may be determined from a visualRF floor map of the organization.

In one implementation, another parameter e.g. software stack embedding including details of software, configurations, average load and scale may be determined. This parameter may be determined based on kind of Operating System (OS) version, key software version, active/new user accounts, kernel modules loaded, running processes, Domain Name System (DNS) lookups, network connections, system scheduler changes, Daemon, background and persistent processes, startup operations, launched entries, OS registry databases, .plist files, browser extensions, and application and system errors.

In one implementation, another parameter e.g. the score based on bandwidth consumption by critical and non-critical applications running across the branch may be determined based on percentage of critical applications and percentage of bandwidth used by non-critical applications.

In one implementation, yet another parameter e.g. the score based on the pattern of network traffic may be determined using mathematical formulation based on factors including duration, protocol type, service, flag, source bytes, destination bytes, wrong fragment, packet count, receiver error rate, network traffic spikes, connection type, destination type, and application traffic type.

In one implementation, the score based on reputation of the branch may be associated with traffic outflow and inflow from various users of a branch. A branch is more susceptible to social engineering attacks media if it has frequent traffic inflow or outflow to social media sites. In one case, the score based on reputation of the branch may be determined using the below provided equation.

$$\text{Branch reputation score} = (a*w\_app + m*w\_URL + f*w\_file + i*w\_ids \; d*w\_dlp)$$

In above mentioned equation, "a" denotes a total number of unpermitted applications accessed within the branch, "m" denotes a total number of malware/susceptible Uniform Resource Locator (URL) requests seen in the branch, "f" denotes a total number of banned file attachments and/or Multipurpose Internet Mail Extensions (MIME) types used in emails seen in devices connected in the branch, "i" denotes a total number of anomalous intrusions detected on devices connected in the branch, and "d" denotes a total number of sensitive data breaches detected for the devices connected in the branch. Further, "w" denotes a weight assigned for each class, thus, w_app denotes weight for unpermitted applications accessed related network attack, w_URL denotes weight for the malware/susceptible URL related network attacks, w_file denotes weight for banned or blocked file attachments and/or MIME types used in email related network attacks, w_ids denotes weight for detected anomalous intrusions, and w_dlp denotes weight for network attacks related to sensitive data breaches.

In one implementation, another parameter e.g. the score based on branch threat (also referred as security score) may be determined based on events related to individual devices e.g. severity, confidence score, and stage and cross-event correlation information e.g. stage change across events of associated devices or network in remote office. Event generation may be performed by tagging of data flow, which can be based on rule based cases, such as Domain Generation Algorithms (DGA), Hypertext Transfer Protocol (HTTP) header order detection, and bit torrent. Further, tagging of the data flow can be based on third party data correlation-based cases, such as Indicators of Compromise (IOC), cyber security risks, or other data.

From the events, one or more interim features to be used for determining the score based on branch threat may be extracted. In one implementation, an entity threat score may be determined using the below mentioned equation.

$$\text{Entity Threat Score} = (0.5*\text{maximum event score}) + (0.25*\text{attack stage feature}) + (0.15*\text{total score feature}) + (0.10*\text{detection type feature}).$$

In above mentioned equation, a maximum event score may be determined using a function "max (event score)" and used as a main feature fed into entity threat score modelling. High threat score is assigned to a specific entity because it hits one or a few high-severity high-confidence events, rather than because the entity hits too many low-severity, low-confidence events which can be false positives of different classifiers. The attack stage feature may be determined as number of attack stages hit by the office/total number of attack stages. The detection type feature may be determined as number of detection types hit by the office/total number of detection types. A total score may be determined as sum (event scores)/max (sum (event scores) of all devices in an office).

In one implementation, another parameter e.g. the score based on network classification and network tagging may be determined based on network connection, for example network cloud or on-premises networks based Local Area Network (LAN), Wide Area Network (WAN), and Metropolitan Area Network (MAN). In one case, network tagging may depend upon on deployment of network, such as education, health care, retail, enterprise, and service provider. In an education deployment, connections have major floating user and device population with device-based authentication. In a healthcare deployment, connections have sensitive data and network. In a retail deployment, connections have more digital transformation and Internet of Things (IoT) devices. In an enterprise deployment, connections have Internet Protocol Secure (IPSec) tunnels and applications aware firewall traffics with Access Control Lists (ACLs) and Role Based Access Control (RBAC). In service provider deployment, connections have multiple tenants and cloud security policies.

To perform the clustering, the system 102 may utilize one or more data clustering techniques including k-means clustering, mean shift clustering, agglomerative hierarchical clustering, Expectation-Maximization (EM) Clustering using Gaussian Mixture Models (GMM), Density-Based Spatial Clustering of Applications with Noise (DBSCAN), and Ordering Points to Identify Clustering Structure (OPTICS).

Figure 3:
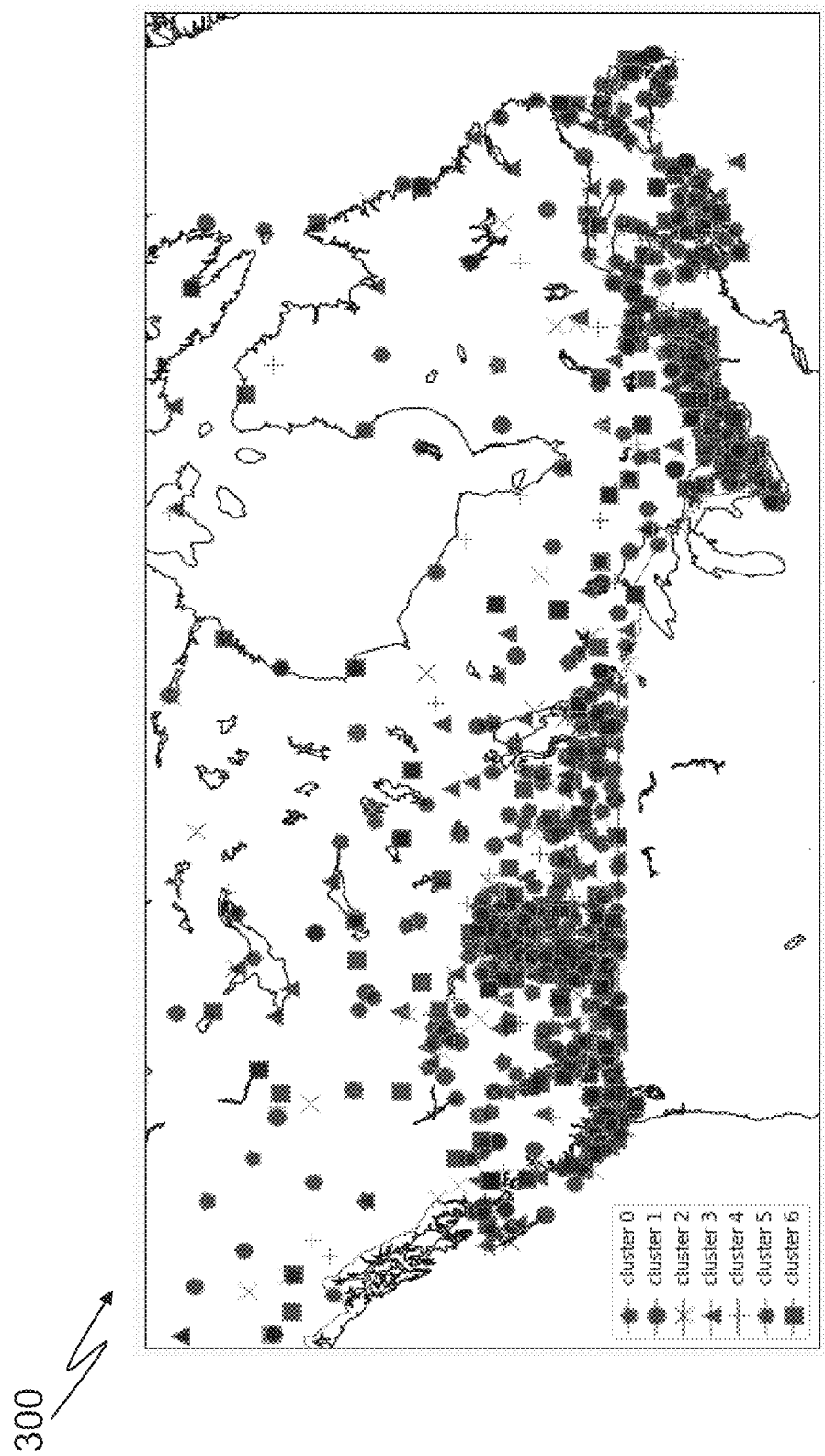
FIG. 3 illustrates a cluster plot including clusters of network sites located in a country, in accordance with an implementation of the present disclosure.

FIG. 3 illustrates a cluster plot 300 including clusters of network sites located in a country, in accordance with an implementation of the present disclosure. In one implementation, network sites of an organization, located in the United States of America were clustered using DBSCAN as the data clustering technique. Such clusters are illustrated in FIG. 3. The parameters and their values utilized during the clustering are mentioned in Table 1 provided below. Values of the features were normalized to standard scaler before being provided to DBSCAN for the clustering.

TABLE 1

| BoC | Location Score | Software Stack | Bandwidth Score | N/W Traffic Score | Device Type Score | Branch Reputation Score | Threat Score |
|---|---|---|---|---|---|---|---|
| A | 0.2 | 0.715 | 0.8 | 0.854 | 0.453 | 0.53 | 0.71 |
| B | 0.1 | 0.625 | 0.7 | 0.543 | 0.653 | 0.89 | 0.82 |
| C | 0.3 | 0.523 | 0.6 | 0.432 | 0.556 | 0.91 | 0.83 |

TABLE 1-continued

| BoC | Location Score | Software Stack | Bandwidth Score | N/W Traffic Score | Device Type Score | Branch Reputation Score | Threat Score |
|---|---|---|---|---|---|---|---|
| D | 0.7 | 0.715 | 0.8 | 0.854 | 0.653 | 0.83 | 0.91 |
| E | 0.5 | 0.632 | 0.7 | 0.743 | 0.432 | 0.81 | 0.74 |

Post generation of the clusters of network sites, the system 102 may train one or more data models on the clusters of network sites. In different implementations, the data models may be trained on data collected from individual network sites, cumulative dataset obtained through aggregation of data obtained from all the network sites, or data collected from the clusters of the network sites.

The one or more data models may be trained using a suitable machine learning technique. For example, deep learning techniques like Convolutional Neural Networks (CNNs), Long Short Term Memory Networks (LSTMs), Recurrent Neural Networks (RNNs), Generative Adversarial Networks (GANs), Radial Basis Function Networks (RBFNs), Multilayer Perceptrons (MLPs), Self-Organizing Maps (SOMs), Deep Belief Networks (DBNs), Restricted Boltzmann Machines (RBMs), and/or autoencoders may be used.

Post training, the system 102 may execute the data models to predict a threat frequency of each network threat for each of the clusters of network sites. It may be noted that threat frequency of the network attacks identified to have occurred over the network sites in the past are predicted, and network threats not observed to have occurred over the network sites may not be considered. For example, if the types of network attacks identified to have occurred over the network sites include Denial of Service (DoS) attack, botnet attack, Trojan attack, worm attack, the threat frequency of only these network attacks is predicted. If a network site or a cluster of network sites has observed occurrence of DoS attacks only, the threat frequency of only the DoS attack is predicted. Further, the threat frequency of a network threat may be predicted for a predefined number of days. For example, if a trained data model is executed on Jan. 1, 2021 to predict threat frequency associated with DoS attack for next three days, the result obtained may be as provided below in Table 2.

TABLE 2

| Date | Number of DoS attacks |
|---|---|
| Jan. 02, 2021 | 17 |
| Jan. 03, 2021 | 18 |
| Jan. 04, 2021 | 18 |

In one implementation, the system 102 may utilize the data obtained through execution of the data models e.g. the predicted threat frequency of each network threat to re-train the one data models. Through such re-training, accuracy of prediction of the data models may get improved.

Figure 4:
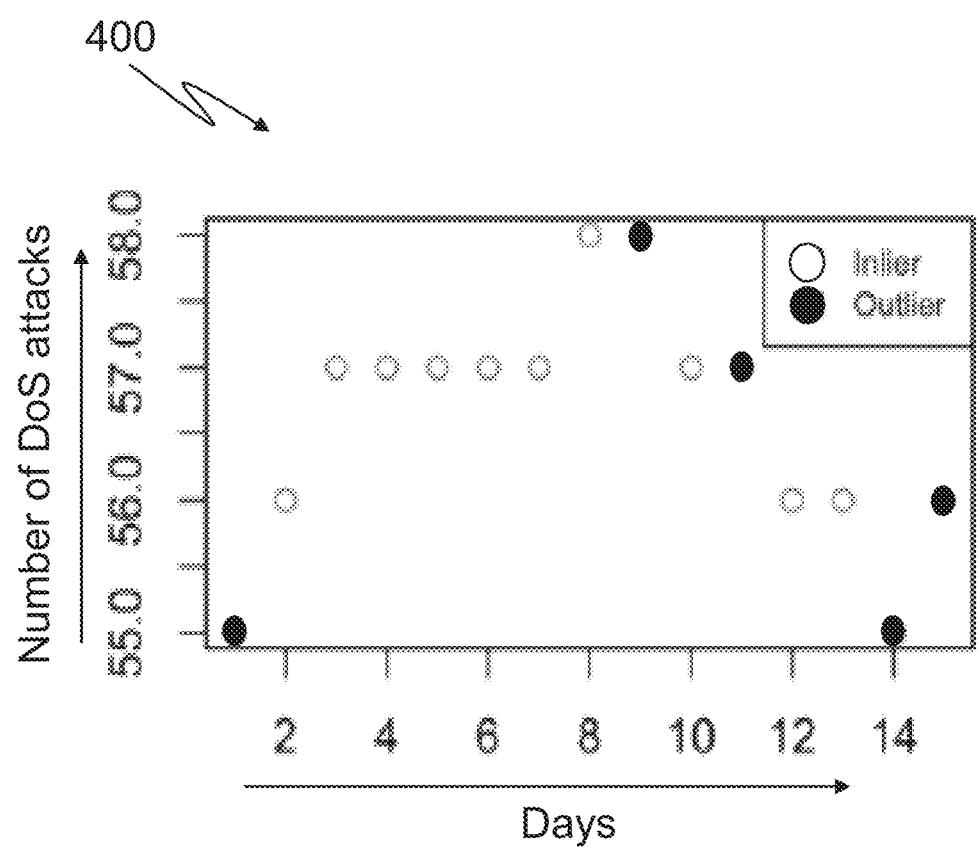
FIG. 4 illustrates a network attack history plot showing a baseline frequency of DoS attacks occurred over a network site during a predefined time period, in accordance with an implementation of the present disclosure.

Successively to executing the data models, the system 102 may determine a difference between the predicted threat frequency of each network threat and corresponding baseline frequencies. The baseline frequencies may include counts of different network attacks occurred on the network sites, over a predefined time period. FIG. 4 illustrates a network attack history plot 400 showing a baseline frequency of DoS attacks occurred over a network site during a predefined time period (for example 15 days), in accordance with an implementation of the present disclosure. The system 102 may determine the baseline frequency as a mean of frequency of complete dataset, mean of frequency of past n-days of dataset, or applying one-class Support Vector Machine (SVM) technique on n-days of dataset.

Based on the difference between the predicted threat frequency of each network threat and corresponding baseline frequencies, the system 102 may configure dynamic rulesets for each cluster by integrating rules applicable to prevent each network threat. A count of the rules integrated to configure the dynamic rulesets may depend on the difference between the predicted threat frequency of each network threat and the corresponding baseline frequencies, associated with each cluster. The difference may be compared with a pre-configured threshold. The pre-configured threshold may be set based on sensitivity of deployment.

In one implementation, a 15% deviation from the baseline frequency may be considered as the pre-configured threshold. When the predicted threat frequency of a particular network threat is identified to have increased from its corresponding baseline frequency by 15%, more rules may be integrated in a ruleset applicable for detecting and preventing such network threat. With integration or inclusion of the rules, severity of the ruleset may increase, for example a lenient ruleset may become a moderate ruleset, and a moderate ruleset may become a strict ruleset. Alternatively, when the predicted threat frequency of a particular network threat is identified to have decreased from its corresponding baseline frequency by 15%, existing rules present in a ruleset for detecting and preventing such network threat may be removed. With removal of the rules, severity of the ruleset may decrease, for example a strict ruleset may become a moderate ruleset and a moderate ruleset may become a lenient ruleset. One or more rulesets determined to be suitable for one or more of the network sites 110 may be implemented at a central network element, for example the virtual gateway 114. Based on implemented rulesets, the virtual gateway 114 along with the system 102 may perform intrusion detection and intrusion prevention by analysing data received from the network sites 110.

Figure 5A:
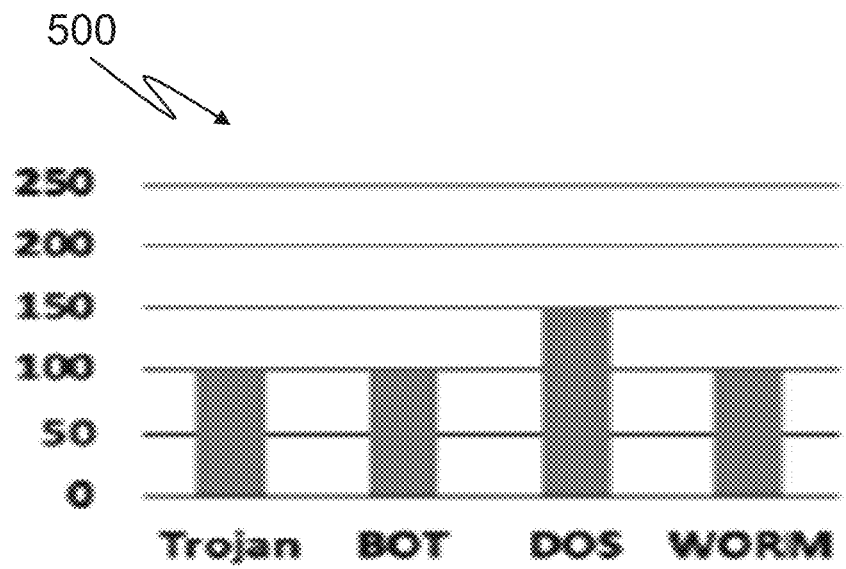
FIGS. 5A, 5B, and 5C illustrate rulesets of different severity implemented in different situations, in accordance with an implementation of the present disclosure.
Figure 5B:
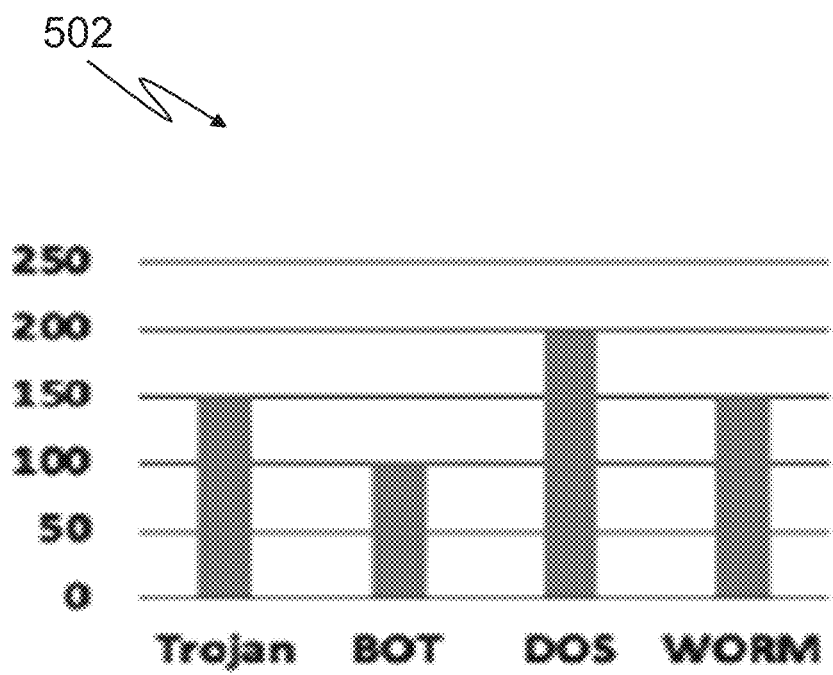
Figure 5C:
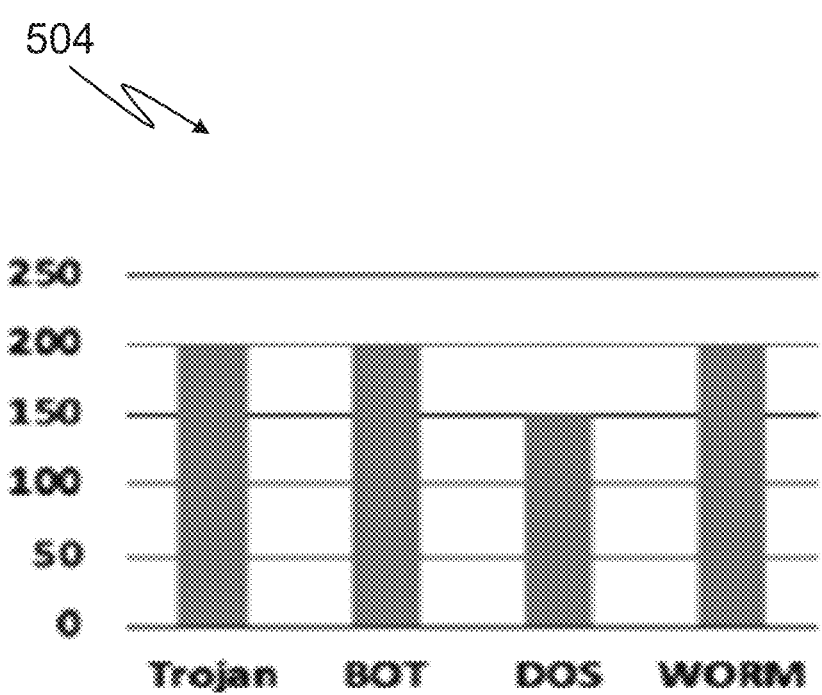

FIGS. 5A, 5B, and 5C illustrate rulesets 500, 502, and 504 of different severity implemented in different situations, in accordance with an implementation of the present disclosure. It may be noted that the y-axis in FIGS. 5A, 5B, and 5C has a scale of 100 times e.g. each reading is 100 times in actual. From FIG. 5A, it could be observed that when the predicted threat frequency is determined to be low for Trojan attack, botnet attack, and worm attack, and high for DoS attack, a lenient ruleset (including 10 k rules) is applied against Trojan attack, botnet attack, and worm attack and a moderate ruleset (including 15 k rules) is applied against DoS attack.

From FIG. 5B, it could be observed that when the predicted threat frequency is determined to be low for botnet attack, high for Trojan attack and worm attack, and very high for DoS attack, a lenient ruleset (including 10 k rules) is applied against the botnet attack, moderate rulesets (including 15 k rules) are applied against the Trojan attack and worm attack, and a strict ruleset (including 20 k rules) is applied against the DoS attack.

From FIG. 5C, it could be observed that in response to determining the predicted threat frequency to be high for DoS attack and very high for Trojan attack, botnet attack, and worm attack, a moderate ruleset (including 15 k rules) is applied against the DoS attack, and strict rulesets (including 20 k rules) are applied against the Trojan attack, botnet attack, and worm attack.

In the above described manner, severity of rulesets is modified for each cluster of network sites based on the type of network threat imminent on them. This ensures that number of rules in the rulesets are kept appropriate to best suit the requirement e.g. accurate detection and prevention of network threats. Therefore, with the above described methodology, a balance between scope of detection of network threats and reduction of false positives is achieved.

Figure 6:
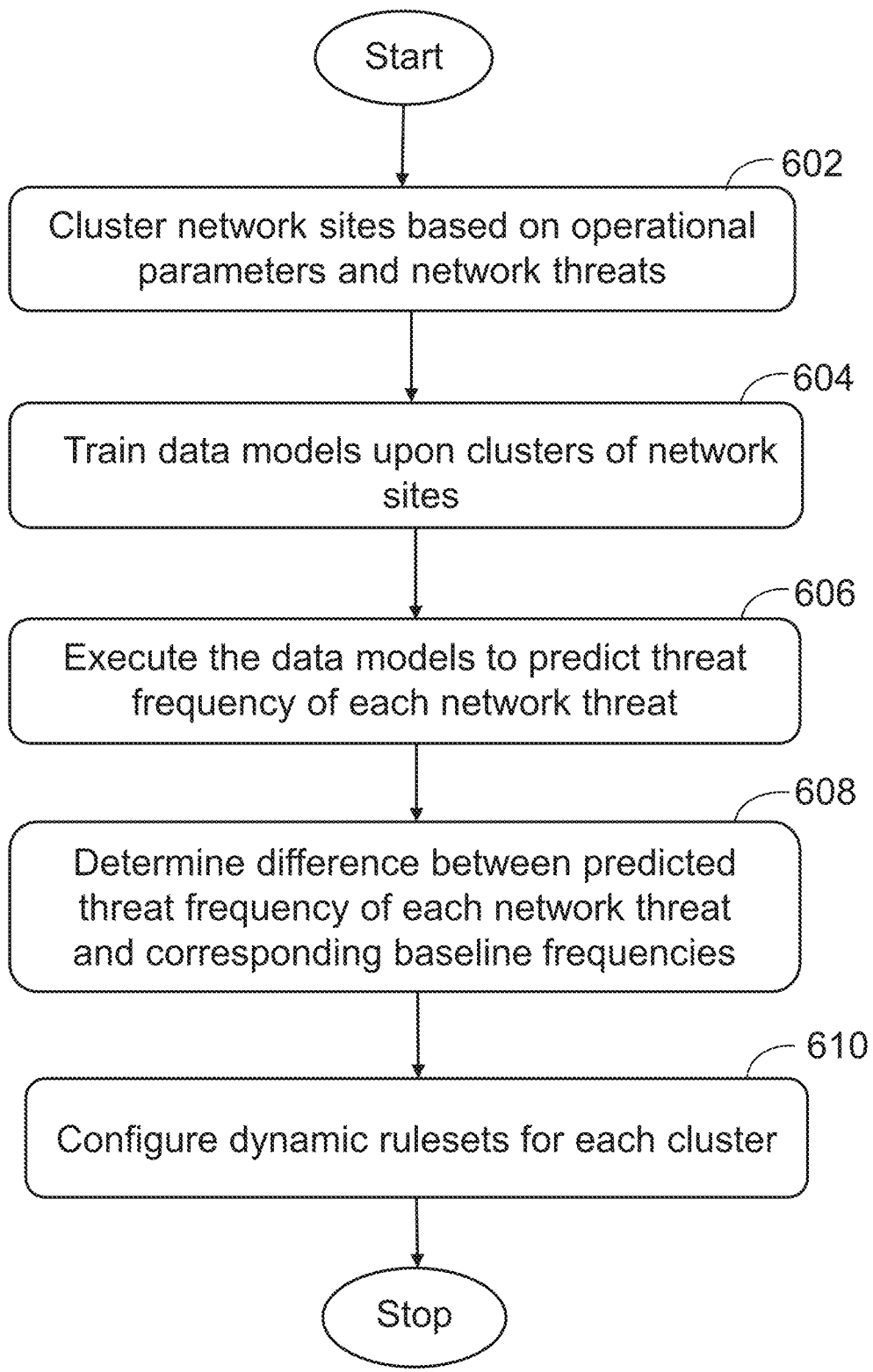
FIG. 6 illustrates a flowchart showing a method of performing intrusion detection and prevention, in accordance with an implementation of the present disclosure.

FIG. 6 illustrates a flowchart showing a method of performing intrusion detection and prevention, in accordance with an implementation of the present disclosure. At step 602, a plurality of network sites may be clustered based on a plurality of parameters. The plurality of parameters may be related to operational features and network threats associated with the plurality of network sites. In some implementations, the plurality of parameters may include location score of a network segment, software stack embedding, a score based on bandwidth consumption by critical and non-critical applications running across the network segment, a score based on pattern of network traffic, a score based on number of different type of network devices connected in the network segment, a score based on user diaspora, a score based on reputation of the network segment, a score based on network threat to the network segment, and a score based on network classification and network tagging.

At step 604, one or more data models may be trained upon the plurality of clusters developed through the clustering. The one or more data models may be trained using a suitable machine learning technique, such as a deep learning technique like Long Short-Term Memory (LSTM).

At step 606, the one or more data models may be executed to predict threat frequency of each network threat for each cluster of the plurality of clusters. The threat frequency would be indicative of chances of occurrence of a particular type of network threat over a cluster.

At step 608, a difference between the predicted threat frequency of each network threat and corresponding baseline frequencies may be determined. Such difference would indicate whether the chances of occurrence of a network threat are higher or lower than a count of occurrence of the network threat observed in the past.

At 610, dynamic rulesets may be configured by integrating rules applicable to prevent each network threat. A count of the rules integrated to configure the dynamic rulesets depend on the difference between the predicted threat frequency of each network threat and the corresponding baseline frequencies, associated with each cluster. With configuration of dynamic rulesets, number of rules sufficient to detect and prevent a particular category of network threat may be applied.

An implementation of the disclosure may be an article of manufacture in which a machine-readable medium (such as microelectronic memory) has stored thereon instructions which program one or more data processing components (generically referred to here as a "processor") to perform the operations described above. In other implementations, some of these operations might be performed by specific hardware components that contain hardwired logic (e.g., dedicated digital filter blocks and state machines). Those operations might alternatively be performed by any combination of programmed data processing components and fixed hardwired circuit components.

A non-transitory computer-readable storage medium includes program instructions to implement various operations embodied by a computing device such as a laptop, desktop, or a server. The medium may also include, alone or in combination with the program instructions, data files, data structures, and the like. The medium and program instructions may be those specially designed and constructed for the purposes, or they may be of the kind well-known and available to those having skill in the computer software arts. Examples of non-transitory computer-readable storage medium include magnetic media such as hard disks, floppy disks, and magnetic tape; optical media such as Compact Disc Read-Only Memory (CD-ROM) disks and Digital Video Disc (DVD); magneto-optical media such as floptical disks; and hardware devices that are especially to store and perform program instructions, such as Read Only Memory (ROM), Random Access Memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described implementations.

Modules as used herein, such as the communication module is intended to encompass any collection or set of program instructions executable over network cloud so as to perform required task by the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on server or other location to perform certain functions.

Any combination of the above features and functionalities may be used in accordance with one or more implementations. In the foregoing specification, implementations have been described with reference to numerous specific details that may vary from implementation to implementation. The specification and drawings are, accordingly, to be regarded in an illustrative rather than a restrictive sense.

An interface may be used to provide input or fetch output from the server. The interface may be implemented as a Command Line Interface (CLI), Graphical User Interface (GUI). Further, Application Programming Interfaces (APIs) may also be used for remotely interacting with the server.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but is no limited to, one or more non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

We claim:

1. A method comprising:
   clustering, using a data clustering technique, a plurality of network sites into a plurality of clusters of network sites based on a plurality of parameters, wherein the plurality of parameters are related to operational features and a network threat associated with the plurality of network sites;
   training, using machine learning, one or more data models upon the plurality of clusters of network sites developed through the clustering, the training of the one or more data models being based on training data;
   executing, by a system comprising a hardware processor, the one or more data models to predict a threat frequency of the network threat for each cluster of the plurality of clusters of network sites;
   determining, by the system, a threat frequency difference between the predicted threat frequency of the network threat and a corresponding baseline frequency for each cluster of the plurality of clusters of network sites, wherein the determining produces a plurality of threat frequency differences for respective clusters of the plurality of clusters of network sites; and
   configuring, by the system, a corresponding dynamic ruleset for each corresponding cluster of the plurality of clusters of network sites by integrating, into the corresponding dynamic ruleset, rules applicable to prevent the network threat in the corresponding cluster, wherein a count of the rules integrated into the corresponding dynamic ruleset depends on a respective threat frequency difference of the plurality of threat frequency differences.

2. The method of claim 1, wherein the plurality of parameters include one or more of: a location score of a network segment, software stack embedding, a score based on bandwidth consumption by applications running across the network segment, a score based on a pattern of network traffic, a score based on a number of different types of network devices connected in the network segment, a score based on user diaspora, a score based on a reputation of the network segment, a score based on a network threat to the network segment, or a score based on network classification.

3. The method of claim 1, further comprising training the one or more data models based on the predicted threat frequency of the network threat.

4. The method of claim 1, wherein the configuring of the corresponding dynamic ruleset comprises adding a new rule to the corresponding dynamic ruleset based on the respective threat frequency difference.

5. The method of claim 4, wherein the configuring of the corresponding dynamic ruleset comprises removing an existing rule from the corresponding dynamic ruleset based on the respective threat frequency difference being less than the predefined threshold.

6. The method of claim 1, wherein the baseline frequency for a given cluster of the plurality of clusters of network sites includes a count of network attacks in the given cluster.

7. The method of claim 1, wherein each data model of the one or more data models is trained on a separate cluster of the plurality of clusters of network sites.

8. The method of claim 1, wherein the one or more data models when executed predict threat frequencies for respective network threats for each cluster of the plurality of clusters of network sites, and the method comprises:
   determining, by the system, threat frequency differences between the predicted threat frequencies for the respective network threats and corresponding baseline frequencies for each cluster of the plurality of clusters of network sites; and
   configuring, by the system, the corresponding dynamic ruleset for each corresponding cluster of the plurality of clusters of network sites using the determined threat frequency differences.

9. The method of claim 1, wherein the network threat comprises one or more of an intrusion into a network site, a denial of service attack, a man in the middle attack, a phishing attack, ransomware, a virus, or a worm.

10. A system comprising:
    a processor;
    a non-transitory storage medium storing instructions executable on the processor to:
      cluster, using a data clustering technique, a plurality of network sites into a plurality of clusters of network sites based on a plurality of parameters, wherein the plurality of parameters are related to operational features and a network threat associated with the plurality of network sites;
      train, using machine learning, one or more data models upon the plurality of clusters developed through the clustering, the training of the one or more data models being based on training data;
      execute the one or more data models to predict a threat frequency of the network threat for each cluster of the plurality of clusters of network sites;
      determine a threat frequency difference between the predicted threat frequency of the network threat and a corresponding baseline frequency for each cluster of the plurality of clusters of network sites, wherein the determining produces a plurality of threat frequency differences for respective clusters of the plurality of clusters of network sites; and
      configure a corresponding dynamic ruleset for each corresponding cluster of the plurality of clusters of network sites by integrating, into the corresponding dynamic ruleset, rules applicable to prevent the network threat in the corresponding cluster, wherein a count of the rules integrated into the corresponding dynamic ruleset depends on a respective threat frequency difference of the plurality of threat frequency differences.

11. The system of claim 10, wherein the plurality of parameters are collected by a virtual gateway serving devices operating in the plurality of network sites, and provided to the system over a network.

12. The system of claim 10, wherein the plurality of parameters include one or more of: a location score of a network segment, a score based on bandwidth consumption by applications running across the network segment, a score based on a pattern of network traffic, a score based on a number of different types of network devices connected in the network segment, a score based on a reputation of the network segment, or a score based on a network threat to the network segment.

13. The system of claim 10, wherein the configuring of the corresponding dynamic ruleset comprises removing an existing rule from the corresponding dynamic ruleset based on the respective threat frequency difference being less than a predefined threshold.

14. The system of claim 13, wherein the configuring of the corresponding dynamic ruleset comprises adding a new rule to the corresponding dynamic ruleset based on the respective threat frequency difference exceeding the predefined threshold.

15. The system of claim 14, wherein adding the new rule to the corresponding dynamic ruleset increases a scope of network threat detection in the corresponding cluster.

16. The system of claim 14, wherein removing the existing rule from the corresponding dynamic ruleset reduces a scope of network threat detection in the corresponding cluster.

17. The system of claim 10, wherein the plurality of parameters are captured along with their timestamps.

18. The system of claim 10, wherein the baseline frequency for a given cluster of the plurality of clusters of network sites includes a count of network attacks in the given cluster.

19. The system of claim 10, wherein the network threat comprises one or more of an intrusion into a network site, a denial of service attack, a man in the middle attack, a phishing attack, ransomware, a virus, or a worm.

20. A non-transitory computer-readable storage medium comprising instructions that when executed cause a system to:
cluster, using a data clustering technique, a plurality of network sites into a plurality of clusters of network sites based on a plurality of parameters, wherein the plurality of parameters are related to operational features and a network threat associated with the plurality of network sites;
train, using machine learning, one or more data models upon the plurality of clusters developed through the clustering, the training of the one or more data models being based on training data;
execute the one or more data models to predict a threat frequency of the network threat for each cluster of the plurality of clusters of network sites;
determine a threat frequency difference between the predicted threat frequency of the network threat and a corresponding baseline frequency for each cluster of the plurality of clusters of network sites, wherein the determining produces a plurality of threat frequency differences for respective clusters of the plurality of clusters of network sites; and
configure a corresponding dynamic ruleset for each corresponding cluster of the plurality of clusters of network sites by integrating, into the corresponding dynamic ruleset, rules applicable to prevent the network threat in the corresponding cluster, wherein a count of the rules integrated into the corresponding dynamic ruleset depends on a respective threat frequency difference of the plurality of threat frequency differences.

* * * * *